United States Patent
Orr et al.

(10) Patent No.: US 9,813,896 B2
(45) Date of Patent: Nov. 7, 2017

(54) RECONFIGURING WIRELESS DEVICE CAPABILITY AND PERFORMANCE

(71) Applicant: Verizon Patent and Licensing Inc., Arlington, VA (US)

(72) Inventors: Sara A. Orr, Glenview, IL (US); Rosemary McNally, Morris Plains, NJ (US); Christopher M. Schmidt, Branchburg, NJ (US); Siva Sandeep Dhandu, Princeton, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 66 days.

(21) Appl. No.: 14/860,820

(22) Filed: Sep. 22, 2015

(65) Prior Publication Data

US 2016/0316358 A1    Oct. 27, 2016

Related U.S. Application Data

(60) Provisional application No. 62/151,106, filed on Apr. 22, 2015.

(51) Int. Cl.
| | |
|---|---|
| *H04W 4/00* | (2009.01) |
| *H04W 72/00* | (2009.01) |
| *H04M 1/00* | (2006.01) |
| *H04W 8/22* | (2009.01) |
| *H04W 28/02* | (2009.01) |
| *H04W 72/12* | (2009.01) |

(52) U.S. Cl.
CPC .......... *H04W 8/22* (2013.01); *H04W 28/0231* (2013.01); *H04W 72/12* (2013.01)

(58) Field of Classification Search
CPC ............................................. H04W 4/00–4/02
See application file for complete search history.

(56) References Cited

U.S. PATENT DOCUMENTS

| | | | |
|---|---|---|---|
| 2010/0099393 A1* | 4/2010 | Brisebois | H04W 48/16 455/418 |
| 2012/0002614 A1* | 1/2012 | Ekici | H04W 48/18 370/329 |
| 2012/0008557 A1* | 1/2012 | Wu | H04W 8/22 370/328 |
| 2012/0046022 A1* | 2/2012 | Kalke | H04M 3/42178 455/419 |
| 2013/0310022 A1* | 11/2013 | Daniel | H04W 24/00 455/423 |
| 2014/0229570 A1* | 8/2014 | Westberg | H04L 65/605 709/217 |
| 2015/0117213 A1* | 4/2015 | Pinheiro | H04W 28/0284 370/235 |

* cited by examiner

*Primary Examiner* — San Htun

(57) ABSTRACT

A method includes configuring a device, which is capable of operating in accordance with a first capability level, at a second capability level that is less than the first capability level. The method also includes identifying a problem or situation in which the first capability level is needed and reconfiguring the device to operate in accordance with the first capability level, in response to identifying the problem or situation. The method may further include determining that the problem or situation has been resolved and configuring the device to operate in accordance with the second capability level, in response to determining that the problem or situation has been resolved.

18 Claims, 8 Drawing Sheets

RECONFIGURING WIRELESS DEVICE CAPABILITY AND PERFORMANCE

RELATED APPLICATION

This application claims priority under 35 U.S.C. §119 based on U.S. Provisional Patent Application No. 62/151,106, filed Apr. 22, 2015, the disclosure of which is hereby incorporated herein by reference.

BACKGROUND INFORMATION

Wireless devices are often identified by specific characteristics and attributes that determine their capabilities and performance limitations. For example, in Long Term Evolution (LTE) networks, the user equipment (UE) category indicates various performance limitations, such as the number of multiple input, multiple output (MIMO) streams, the types of modulation schemes, the buffer size and the peak data throughput rates that a device (i.e., a UE) can support.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to devices, systems and methods that enable a device with high performance processing capabilities to be activated and operated in less than its full capability mode based on the particular scenario, context and/or environment in which the device is operating. As an example, an LTE Category 4 device can operate at a peak downlink rate of approximately 150 Megabits per second (Mbps) and a peak upload rate of approximately 50 Mbps. In accordance with one implementation, an LTE Category 4 device may be configured to operate as a Machine Type Communications (MTC) device (e.g., as an LTE Category 1 device, LTE Category 0 device, etc.) which has lower peak download and upload capabilities than a conventional LTE Category 4 device.

Configuring the LTE Category 4 device as a lower capability type device may be used, for example, in a scenario where the UE is functioning as a backup mode of communications in a system in which the primary mode of communications is a wired communication connection. In this scenario, if a problem occurs in the primary wired mode of communications, the UE may be re-configured to operate as an LTE Category 4 device, with the wireless communications from/to the UE acting as the primary mode of communications for the system, as described in detail below. Configuring the LTE Category 4 device as a lower capability device may also be used to reduce network congestion, as described in detail below.

Figure 1:
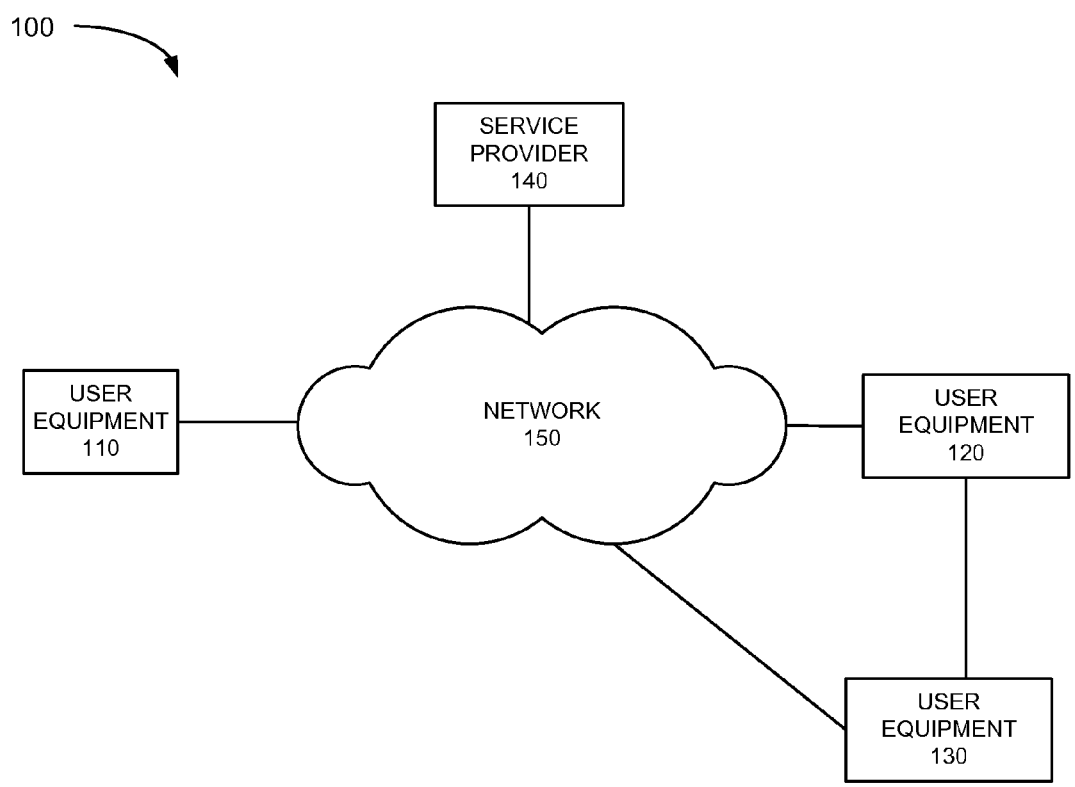
FIG. 1 illustrates an exemplary environment in which systems, devices and methods described herein may be implemented.

FIG. 1 is a block diagram of an exemplary environment 100 in which systems and methods described herein may be implemented. Environment 100 may include user equipment (UE) 110, UE 120, UE 130, service provider 140 and network 150. UEs 110-130 and service provider 140 may connect to network 150 and/or each other via wired, wireless or optical communication mechanisms.

Each of UEs 110-130 may include a mobile communication device (e.g., a mobile phone, a smart phone, a personal digital assistant (PDA), a phablet device, a wearable computer device (e.g., a head-mounted display computer device, a wristwatch computer device, etc.), a global positioning system (GPS) device, and/or another type of wireless device); a laptop computer, a tablet computer, a palmtop receiver, or another type of portable computer; a media playing device; a portable gaming system; a remote control device and/or any other type of mobile computer device with communication and output capabilities.

In another implementation, one or more of UEs 110-130 may include various user equipment, such as a video game system, a television, a set top box (STB), a home router used for providing Internet and/or television programming services to a customer's home, a video cassette recorder (VCR), a digital versatile disc (DVD) player, a compact disc (CD) player, a home security system, a vehicle telematics system, etc., that may be controlled by or interact with other ones of UEs 110-130 and/or service provider 140.

In still other implementations, one or more of UEs 110-130 may include an embedded wireless device that communicates wirelessly with other devices over a machine-to-machine interface. For example, UE 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Examples of such devices include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, a kiosk, etc.), and/or another type of electronic device.

Service provider 140 may include one or more computing devices, servers, etc., associated with providing services to customers. For example, service provider 140 may be associated with providing television, telephone and Internet services to customers. As other examples, service provider 140 may provide home security/monitoring services, vehicle monitoring services, environmental monitoring services (e.g., heating, ventilating, air conditioning, lighting, etc.), or any other services to customers.

Network 150 may include one or more wired, wireless and/or optical networks that are capable of receiving and transmitting data, voice and/or video signals, including multimedia signals that include voice, data and video information. For example, network 150 may include one or more public switched telephone networks (PSTNs) or other type of switched network. Network 150 may also include one or more wireless networks and may include a number of transmission towers for receiving wireless signals and forwarding the wireless signals toward the intended destination. Network 150 may further include one or more packet switched networks, such as an Internet protocol (IP) based network, a local area network (LAN), a wide area network (WAN), a personal area network (PAN), an intranet, a satellite-based network, the Internet, or another type of network that is capable of transmitting data.

For example, network 150 may include a Long Term Evolution (LTE) access network (e.g., an evolved packet core (EPC) network) based on the LTE standard specified by the $3^{rd}$ Generation Partnership Project (3GPP). The LTE access network may include one or more devices that implement logical entities interconnected via standardized interfaces.

Network 150 may also include a Code Division Multiple Access (CDMA) access network based on, for example, a CDMA2000 standard. For example, the CDMA access network may include a CDMA one times radio transmission technology (1×RTT) network, a CDMA High Rate Packet Data (HRPD) network (which may include a CDMA evolution optimized data only (EV-DO) network), or a CDMA eHRPD network (which may provide access to an LTE access network).

Network 150 may further include a Global System for Mobile Communications (GSM) access network based on a GSM standard. For example, the GSM access network may include a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network.

In some implementations, the level of processing performed by devices in network 150, such as devices in a wireless network (e.g., evolved Node Bs (eNBs), serving gateways (SGWs), packet gateways (PGWs), mobility management entities (MMEs), home subscriber servers (HSSs), policy charging and rules function (PCRF) devices, authentication, authorization, and an accounting (AAA) devices, etc.), may be reduced when UEs, such as UEs 110-130 operate in lower capability modes. Such reduced processing by devices in network 150 may result in cost savings for the network service provider associated with network 150. In some instances, the cost savings associated with the reduced processing may be used to provide an incentive for users to utilize various devices at a reduced capability mode when the full capabilities are not required, such as when a device is operating in a backup capacity or when the amount of traffic being transmitted to/from the UE is low.

The exemplary configuration illustrated in FIG. 1 is provided for simplicity. It should be understood that a typical network may include more or fewer devices than illustrated in FIG. 1. For example, other devices that facilitate communications between the various entities illustrated in FIG. 1 may also be included in network 100. In addition, UEs 110-130 and service provider 140 are each shown as separate elements. In other instances, the functions described as being performed by one or more of UEs 110-130 and/or service provider 140 may be performed by a single device or entity.

Figure 2:
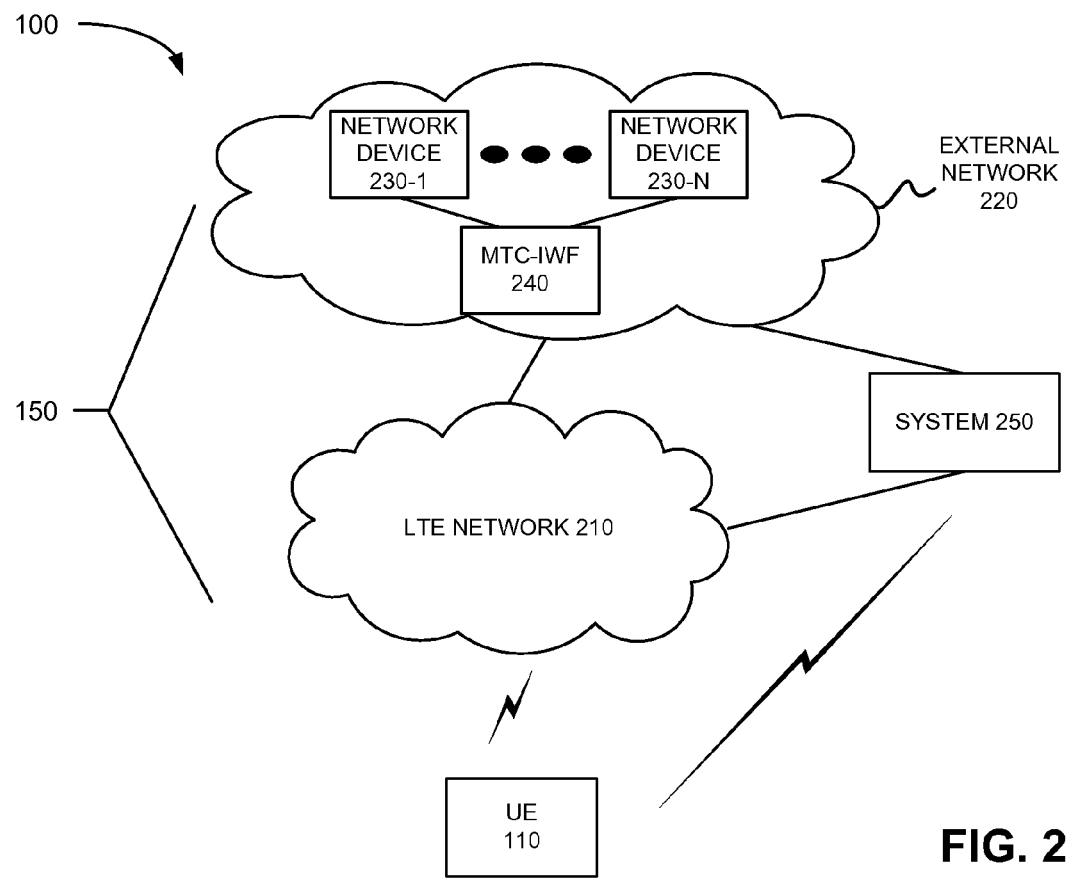
FIG. 2 illustrates an exemplary network included in the environment of FIG. 1

FIG. 2 is a diagram illustrating an exemplary portion of environment 100. Referring to FIG. 2, network 150 includes an LTE network 210 and an external network 220. LTE network 210 may include conventional devices in an LTE network, such as eNBs, SGWs, PGWs, MMEs, HSSs, PCRF devices, AAA devices (not shown for simplicity). LTE network 210 may include a network defined by a $3^{rd}$ Generation Partnership Project (3GPP) specification or LTE architecture. The devices in LTE network 210 (e.g., eNBs, SGWs, PGWs, MMEs 225, and PCRF devices, etc.) may each operate according to the LTE specification or architecture.

External network 220 includes network devices 230-1 through 230-N (referred to collectively as network devices 230, and individually or generally as network device 230) and a Machine Type Communications-Interworking Function (MTC-IWF) 240.

Network 150 may include wired, optical, and/or wireless connections among the devices and the networks illustrated in FIG. 2. A connection may be direct or indirect and may involve an intermediary device not illustrated in FIG. 2. For example, network 150 may include a femto device, a pico device, a home eNB, a Node B, a serving general packet radio service (GPRS) support node (SGSN), a gateway GPRS support node (GGSN), etc. Additionally, or alternatively, a connection may involve an intermediary network not illustrated in FIG. 2. For example, network 150 may include a network between LTE network 210 and another network (e.g., a 2G network, a 2.5G network, a 3G network, a 3.5G network, etc.). Additionally, the number, type (e.g., wired, wireless, etc.), and the arrangement of connections between the devices and the networks are exemplary.

External network 220 may include one or multiple networks. For example, external network 220 may be implemented as a service or application-layer network, the Internet, an Internet Protocol Multimedia Subsystem (IMS) network, a proprietary network, a cloud network, a data network, etc. External network 220 includes network devices 230-1 through 230-N (referred to collectively as network devices 230 and individually as network device 230 or 230-*x*) and machine-type communications interworking function (MTC-IWF) 240. Network devices 230 may each include a computer, server or other computing device that provides an application or a service. For example, network device 230-1 may provide a machine-to-machine (M2M) application or service. MTC-IWF 240 may include a network device that acts as an intermediary device between a wireless network (e.g., LTE network 210) and M2M application/services (e.g., network devices 230).

The number of devices, the number of networks, and the configuration shown in network 150 are exemplary. According to other embodiments, network 150 may include additional devices, fewer devices, and/or differently arranged devices, than those illustrated in FIG. 2. Additionally, or alternatively, network 150 may include an additional network and/or differently arranged networks, than those illustrated in FIG. 2. Also, according to other embodiments, one or more functions and/or processes described as being performed by a particular device may be performed by a different device, or some combination of devices.

Environment 100 illustrated in FIG. 2 also includes system 250. System 250 may include one or more computing devices, servers, etc., that are used to provide various offers to a user associated with UE 110. For example, system 250 may be associated with a manufacturer or distributor of a product, such as a television, home security system, vehicle telematics system, etc., that may provide offers to the user associated with upgrading the capabilities of UE 110, as described in detail below.

Figure 3:
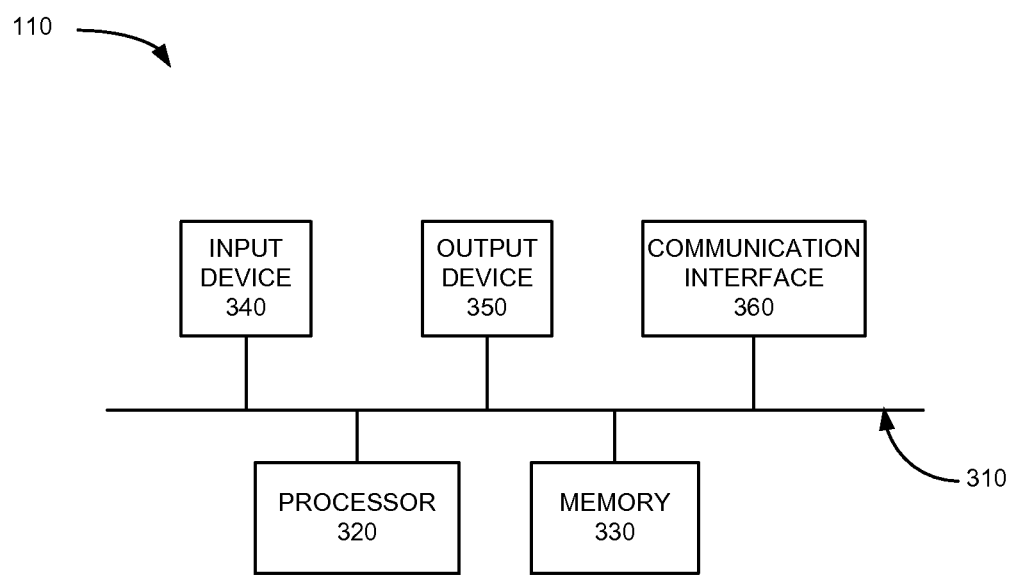
FIG. 3 illustrates an exemplary configuration of one or more of the devices of FIG. 1.

FIG. 3 illustrates an exemplary configuration of UE 110. UEs 120 and 130, service provider 140, network devices 230 and system 250 may be configured in a similar manner. Referring to FIG. 2, UE 110 may include bus 310, processor 320, memory 330, input device 340, output device 350 and communication interface 360. Bus 310 may include a path that permits communication among the elements of UE 1100.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to UE 110, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display), a printer, a speaker, etc.

Communication interface 360 may include a transceiver that UE 110 uses to communicate with other devices via wired, wireless or optical mechanisms. Communication interface 360 may also include one or more radio frequency (RF) transmitters, receivers and/or transceivers and one or more antennas for transmitting and receiving RF data via network 150. Communication interface 360 may also include a modem or an Ethernet interface to a LAN or other mechanisms for communicating with elements in a network, such as network 150 or another network.

The exemplary configuration illustrated in FIG. 3 is provided for simplicity. It should be understood that UE 110 (or UE 120, 130, service provider 140, network devices 230 and/or system 250) may include more or fewer devices than illustrated in FIG. 3. In an exemplary implementation, UE 110 may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), solid state drive (SSD), etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
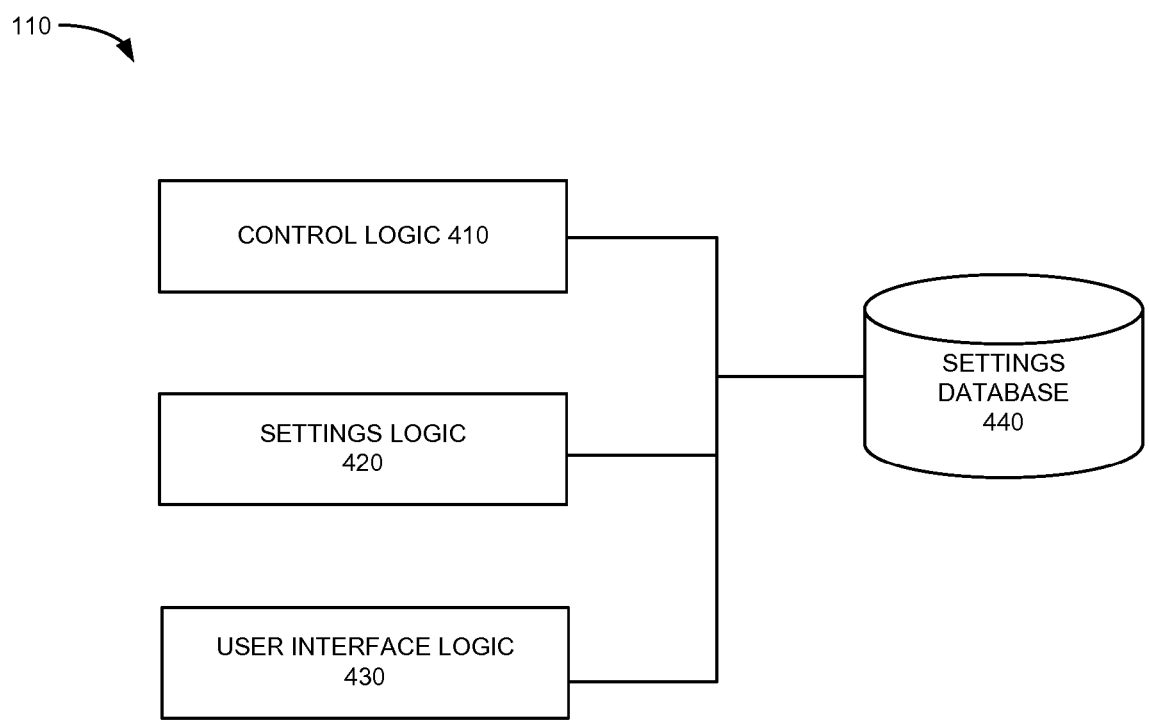
FIG. 4 is a diagram of exemplary logic components implemented in one or more of the UEs of FIG. 1.

FIG. 4 is an exemplary functional block diagram of components implemented in UE 110. Similar components may be included in UEs 120 and 130. UE 110 includes control logic 410, settings logic 420, user interface logic 430 and settings database 440. In an exemplary implementation, some or all of the components illustrated in FIG. 4 may be software elements stored in memory 330 and that are executed by processor 320. In other implementations, some or all of the components may be hardware elements implemented by, for example, application specific integrated circuits (ASICs), field programmable gate arrays (FPGAs), or other hardware logic elements. In each case, the components implemented in UE 110 allow UE 110 to operate in multiple configurations having different capabilities, based on the particular scenario or context in which UE 110 is operating, and/or based on user-initiated actions, as described in more detail below.

Control logic 410 includes logic configured to control operations of UE 110. For example, control logic 410 may initialize UE 110 upon power up, detect an appropriate mode of operation based on various conditions and set UE 110 to the appropriate operating mode. Control logic 410 may also automatically switch an operating mode of UE 110 based on the context in which UE 110 is operating, user-initiated actions, or a combination of these and/or other factors, as described in detail below.

Settings logic 420 may include logic to control various settings associated with operation of UE 110. For example, settings logic 420 may interact with control logic 410 and settings database 440 to provide the appropriate settings for operation of UE 110 in various different operating modes, such as an LTE Category 1 device, an LTE Category 6 device, etc. The settings may include hardware settings, firmware settings and/or software settings for various devices in UE 110.

User interface logic 430 may include logic to allow a user to enter information associated with selecting a mode in which UE 110 operates. For example, user interface logic 4310 may include a graphical user interface (GUI), an input button (e.g., a hardware button or a software button on UE 110), etc., that allows the user to request a change (e.g., a performance upgrade) with respect to the mode of operation of UE 110, such as change from operating as an LTE category 1 device to an LTE category 6 device, or vice versa. The GUI may also allow a user to respond to a communication from service provider 140, system 250, etc., inquiring as to whether the user would like to upgrade the performance capability of UE 110. In each case, control logic 410 may receive the selection provided via user interface logic 430 and place UE 110 in the appropriate operating mode.

In some implementations, user interface logic 430 may include a GUI that displays a plurality of modes in which UE 110 may operate and allows the user to select a particular mode. The GUI may also allow the user to enter information identifying parameters that define settings associated with each mode of operation, such as context-based settings that define conditions in which UE 110 is to operate in particular modes, such as when a problem occurs with another mode of communications. For example, the GUI may allow the user to identify various scenarios, such as a failure associated with a primary mode of communications (e.g., a wired connection), in which UE 110 is to be automatically reconfigured to take over as the primary mode of communications.

In still other instances, the GUI may allow the user to identify various contexts, such as hours of the day, days of the week, particular dates, location information, event-related information etc., during which UE 110 is to operate in a reduced capability mode or full capability mode, as described in more detail below.

Settings database 440 may include one or more databases that store settings associated with operating UE 110 in different modes of operation. For example, settings database 440 may store hardware settings, firmware settings and/or software settings associated with each of various different categories of operation for UE. As an example, settings database 440 may store settings information associated with operating UE 110 as an LTE category 0 device, category 1 device, category 2 device, category 3 device, category 4 device, category 5 device, category 6 device, etc., or in some other configuration.

Settings database 440 may also store context information associated with identifying an operating mode in which UE 110 is to operate. For example, settings database 440 may store information indicating that during peak data hours (e.g., 8:00 AM to 5:00 PM on Monday through Friday), UE 110 is to operate in a lower capacity mode (e.g., as a Category 1) device, or that when control logic 410 detects an outage in a primary mode of communications for a system, UE 110 is to operate in a higher capacity mode (e.g., an LTE Category 6 device) and function as the new primary mode of communications.

Settings database 440 may also store additional information indicating exceptions to any general context-based rule setting information. For example, settings database 440 may store information indicating that when the user is on vacation, as identified by, for example, an entry in a calendar application stored on UE 110, not at home/working, etc., UE 110 should operate in a reduced capacity mode. As an alternative, when UE 110 corresponds to a home security monitoring system, settings database 440 may store information indicating that UE 110 is to provide upgraded capabilities, such as streaming video information associated with security cameras, when the user/customer is on vacation.

The elements illustrated in FIG. 4 are shown as being located within UE 110. In alternative implementations, these components or a portion of these components may be located externally with respect to UE 110. For example, in some implementations, one or more of the components illustrated in FIG. 4 may be located in or executed by another device external to UE 110, such as service provider 140. As one example, settings database 440 may be stored on an external computer or server. In this case, UE 110 may periodically access and/or synchronize with the external computer or server to obtain the setting information from settings database 440. In still other instances, UE 110 may synchronize with settings database 440 (located externally with respect to UE 110) when changes are made to settings database 440.

Figure 5:
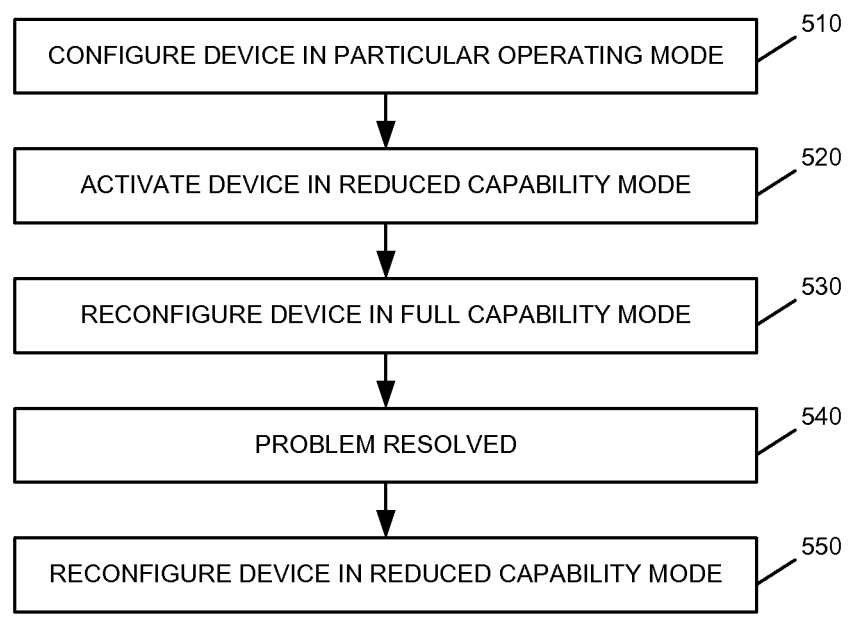
FIG. 5 is a flow diagram illustrating processing associated with the environment of FIG. 1 in accordance with an exemplary implementation.
Figure 6:
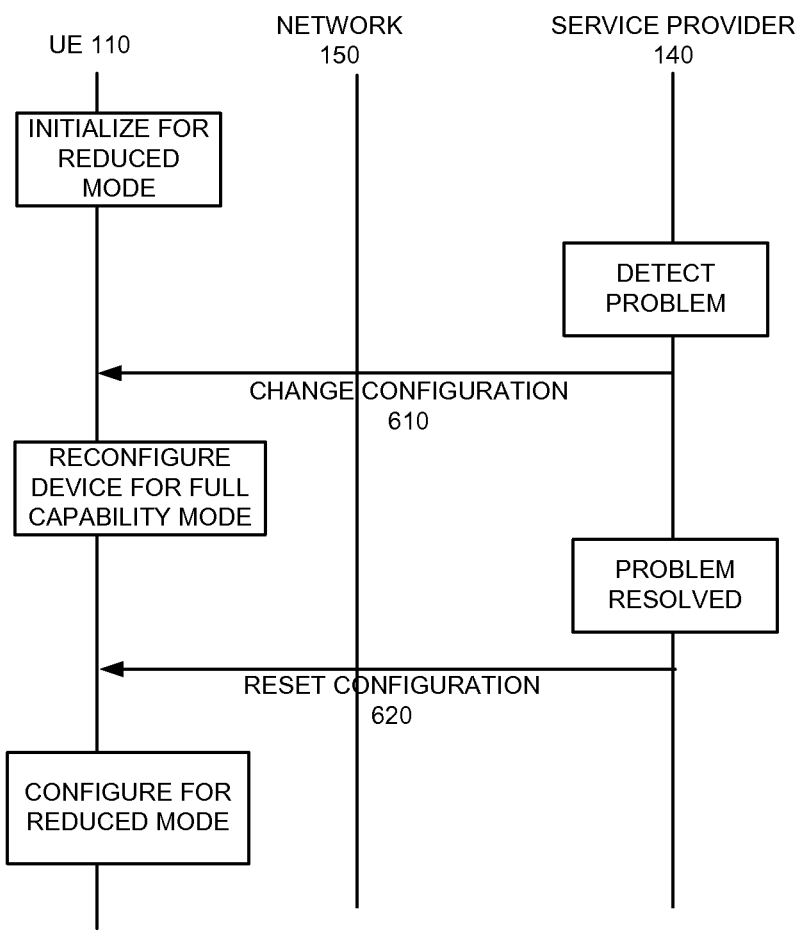
FIG. 6 is a signal flow diagram associated with the processing of FIG. 5.

FIG. 5 illustrates exemplary processing associated with configuring a device based on the particular scenario in which the device is operating and FIG. 6 is a signal flow diagram associated with the processing of FIG. 5. Processing may begin with a device, such as UE 110, being configured to operate in accordance with a particular operating mode (block 510). For example, UE 110 may be an LTE Category 6 device that is being used in a system that includes a wired communication connection that functions as a primary communication connection for the system. In this case, UE 110 may function as a backup communication device and UE 110 may be configured in a lower operating mode, such as an LTE Category 1 or Category 0 device or some MTC device.

In one implementation, service provider 140 may signal UE 110 via network 150 indicating that UE 110 is to operate as a reduced capability device (e.g., as a Category 1 or Category 0 device). In this scenario, service provider 140 may send a signal to UE 110 to change its configuration, send a software update to UE 110 associated with the reduced capability operations, etc. In other instances, a user at UE 110 may configure UE 110 to operate as a reduced capability device via input received by user interface logic 430, such as using a GUI or set up menu provided by user interface logic 430 and displayed to the user via an LCD screen on UE 110. In still other instances, a user at UE 110 may configure UE 110 to operate as a reduced capability device via one or more buttons, such as a physical button or a software button/input on UE 110, or via other mechanisms.

In each case, control logic 410 may communicate with settings logic 420 to indicate the appropriate operating mode/category for UE 110. Settings logic 420 may communicate with settings database 440 to retrieve the appropriate configuration setting information. Settings logic 420 may then modify the appropriate settings for UE 110, if necessary, so that UE 110 will be configured in its reduced capability mode. UE 110 is then activated in the reduced capability mode (block 520).

Assume that a situation arises in which the full capability of UE 110 would be beneficial to the end user, customer and/or business. For example, continuing with the example above, assume that UE 110 is operating as a backup communication device for a system, such as a system at a customer's home premises, a work environment, etc., in which the primary mode of communication is a wired connection that has failed/stopped working. In this scenario, UE 110 may be reconfigured to utilize its full capabilities as an LTE Category 6 device (block 530).

For example, in one implementation, service provider 140 may send a configuration update (FIG. 6, change configuration message 610) to UE 110 instructing UE 110 to operate/upgrade to function as an LTE Category 6 device. In some implementations, service provider 140 may send an over the air software update to UE 110 to enable UE 110 to be configured in the new operating mode. In other implementations, service provider 140 may send an instruction for UE 110 to reconfigure itself as a Category 6 device. In still other implementations, a user associated with UE 110 may reconfigure UE 110 by accessing a setup menu provided by user interface logic 430, pressing a button on UE 110, etc., to reconfigure UE 110 to its full capability mode. In some cases, as part of the reconfiguring process, UE 110 may need to power cycle (e.g., power down and power back on), reboot, etc., and then re-attach or connect to network 150 in the reduced capability mode.

In this scenario, the newly configured UE 110 may operate as an LTE Category 6 device that can support peak download data rates of 300 Mbps and peak upload data rates of 50 Mbs. In this example, UE 110 may then take over communications for the system and operate as the primary mode of communications for a system associated with UE 110.

Assume that at a later time, the temporary situation regarding the problem with the initial primary mode of wired communications is resolved (block 540). For example, assume that the wired connection is restored. In this case, UE 110 may be reconfigured to operate in the reduced capability mode (block 550). For example, service provider 140 may send a reset configuration message (FIG. 6, 620) to UE 110 indicating that the situation has been resolved and instruct UE 110 to reconfigure itself as the lower capability device (e.g., e.g., a Category 1 or Category 0 device).

In other implementations, UE 110 may detect that the wired connection has been restored and automatically switch back to the reduced capability mode. In still other implementations, a user associated with UE 110 may reconfigure UE 110 (via user interface logic 430, such as via a setup menu, a hardware button, a software button) to reconfigure UE 110 in the reduced capability mode.

In each case, UE 110 may be reconfigured to the original reduced capability mode. For example, control logic 410 may signal settings logic 420 to operate in the reduced capability mode. Settings logic 420 may communicate with settings database 440 and configure the appropriate components of UE 110 to operate in the reduced capability mode. In some instances, UE 110 may power cycle (e.g., power down and power back on), reboot, etc., and then re-attach to network 150 in the reduced capability mode as part of the reconfiguring process.

As described above, in accordance with an exemplary implementation, a device may operate in a reduced capability mode for a period of time and then switch to a full capability mode based on a particular scenario and/or problem. It should be understood that features described above may be used in any environment and is not limited to situations when a problem occurs.

Figure 7:
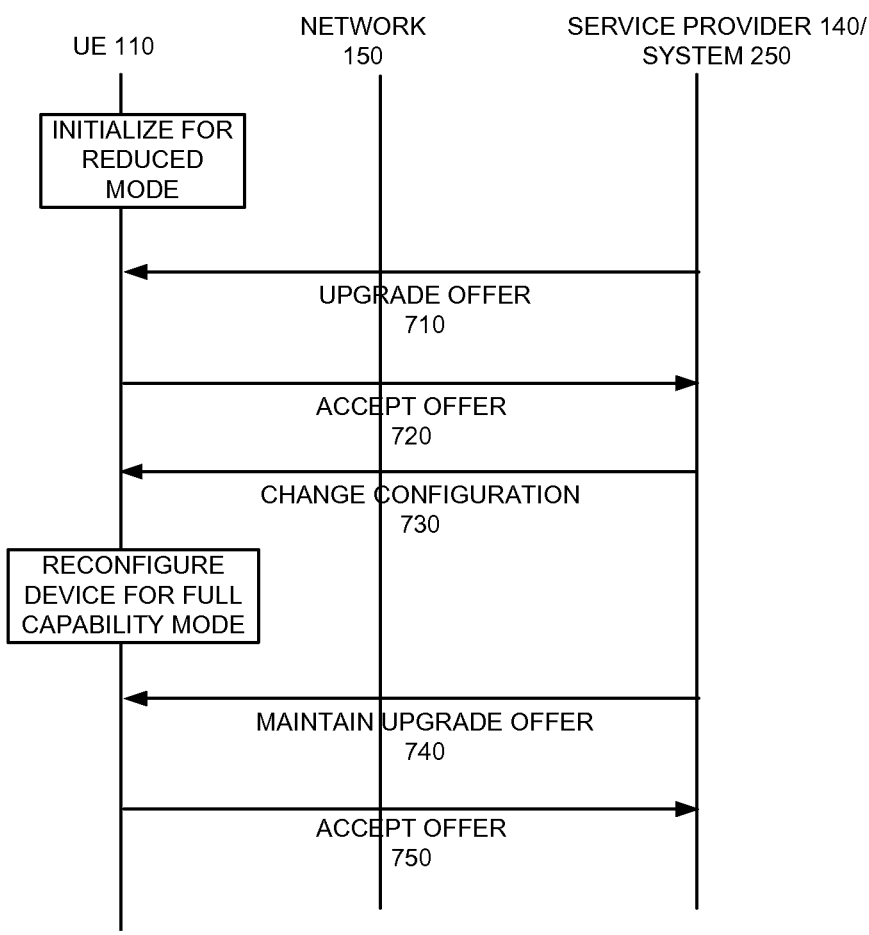
FIG. 7 is a signal flow diagram associated with another exemplary scenario associated with the environment of FIG. 1.

For example, in another scenario, a service provider or manufacturer of a product may interact with a user of UE 110 and provide an option to upgrade the performance capabilities of a product and/or service. FIG. 7 illustrates an exemplary signal flow diagram of another scenario in which UE 110 may be reconfigured. Assume that a manufacture or distributor of televisions manufactures and/or distributes televisions with high end performance capabilities, such as Internet connectivity, video streaming capabilities, various application access, etc. Further assume that the manufacturer/distributor also sells the high end televisions to some consumers at a lower price with reduced capabilities. In this scenario, UE 110 may be initialized in the reduced capability mode by the manufacturer or distributor prior to the sale, as illustrated in FIG. 7.

After a period of time, the manufacturer of the television (e.g., represented by system 250 in FIG. 2), or a service provider associated with providing television services to UE 110 (e.g., service provider 140) may communicate with the customer offering a free upgrade for a period of time in which UE 110 (e.g., the television) will utilize the high performance capabilities of the television (e.g., video streaming capabilities, etc.) (FIG. 7, signal 710). UE 110 may receive the communication and control logic 410 may display the offer to the user of UE 110 via user interface logic 430. For example, user interface logic 430 may display the message "Do you want to upgrade your TV for a free trial period?" via the television screen.

The user associated with UE 110 may accept the offer (signal 720). In this case, service provider 140 (or the television manufacturer represented by system 250) may send a communication to UE 110 to reconfigure the television to the full capability mode (signal 730).

After receiving signal 730, control logic 410 may signal settings logic 420 to set the components in the full capability mode. Settings logic 420 may communicate with settings database 440 to obtain the appropriate setting information.

After the free trial has expired, service provider 140 or the manufacturer represented by system 250 may inquire whether the customer would like to pay a one time fee, a monthly fee, etc., to continue to access the full capabilities of UE 110 (i.e., the television in this example). For example, service provider 140 may send a communication inquiring whether the customer would like to continue to operate the television in the full capabilities mode (signal 740). If the customer does not accept the offer, the manufacturer may signal the television (e.g., UE 110) to reconfigure itself back to the reduced capability mode. However, if the customer accepts the offer, the customer, via UE 110, may send a message back to service provider 140 or system 250 indicating that he/she would like to accept the offer (signal 750). If the offer is accepted, UE 110 remains configured in the full capability mode.

As another example, a car manufacturer may provide various telematics services associated with the operation of a motor vehicle, such as monitoring oil pressure, tire pressure, engine, speed, fuel, etc., provide a concierge type service with human interaction to obtain information, such as voice communications with an operator for directions, making a reservation, ordering a product, etc. In this example, assume that the car manufacturer represented by system 250 offers the customer a free radio streaming service, a video streaming service, WiFi hotspot access, etc., via UE 110 (e.g., a vehicle telematics system) installed in the car. In this case, the manufacturer may communicate with the vehicle's telematics system to reconfigure the system to a full capability mode. After the free trial is over, the manufacturer may inquire whether the customer would like to pay a one time fee, a monthly fee, etc., to continue the high performance services (e.g., steaming radio, streaming video, WiFi access, LTE communications) via UE 110 (e.g., the vehicle's telematics system). If the customer does not accept the offer, the manufacturer may signal UE 110 (i.e., the vehicle telematics system in this example) to reconfigure itself in the reduced capability mode.

Figure 8:
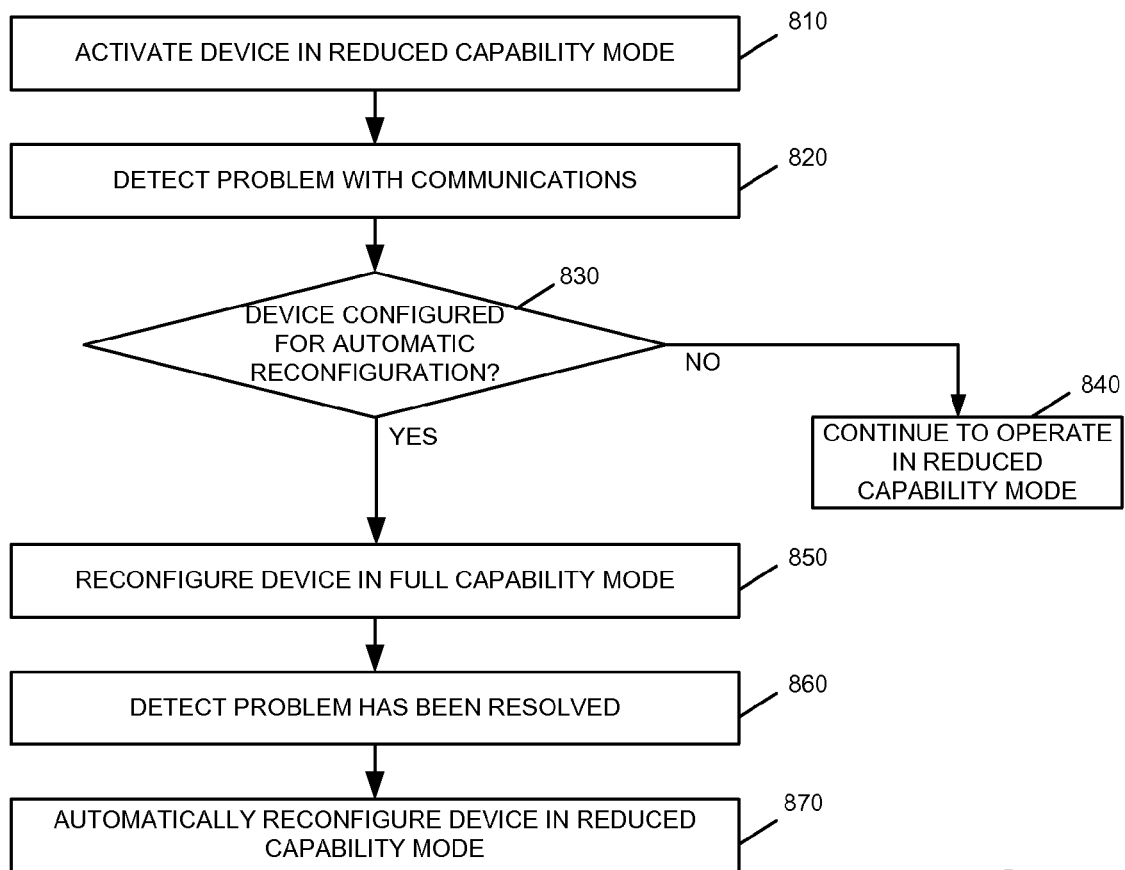
FIG. 8 is a flow diagram illustrating processing associated with the environment of FIG. 1 in accordance with another exemplary implementation.

FIG. 8 is a flow diagram illustrating another example of UEs operating in reduced or full capability mode. Assume that UE 110 is a wireless security/alarm system in a customer's home that supports low performance capability in which the security/alarm system can place voice calls to a central monitoring system. The wireless security/alarm system, however, may also be configured to operate as a high capability device that provides Internet services to a customer, such as streaming video for a security camera. In this case, assume that UE 110 is activated in the reduced capability mode (block 810). Further assume that UE 110 detects a power outage or other problem that causes the customer's home Internet service to go down (block 820). For example, UE 110 may monitor power levels (e.g., voltage levels) provided by the electric company to the user's home, intermittently monitor Internet connections from the home to an Internet service provider (e.g., service provider 140), etc.

In each case, assume that UE 110 detects the problem (e.g., the power problem, Internet connection problem, etc.). UE 110 may then determine whether UE 110 is configured for automatic reconfiguration (block 830). For example, a customer associated with the home in which UE 110 is located may have configured UE 110 to function as an Internet hub when a problem with power or communications occurs with a home router in the customer's home. If UE 110 is not setup for automatic reconfiguration (block 830—no), UE 110 may continue to operate in the reduced capability mode (block 840).

However, if UE 110 is configured for automatic reconfiguration (block 830—yes), UE 110 may be reconfigured in full capability mode (block 850). UE 110 may then act as an Internet hub to provide Internet connectivity to the customer's home via, for example, wireless communications from various other user devices to UE 110. In some cases, service provider 140 may confirm the upgrade via an inquiry to the customer via UE 110. For example, service provider 140 may send a message that will be displayed on UE 110 confirming that UE 110 has been upgraded to operate at its higher capability level.

UE 110 may then be reconfigured to operate in the full capability mode that includes providing Internet services/ access. Assume that the problem, such as the problem with the customer's primary Internet service or power is resolved. UE 110 may detect that the problem is resolved via monitoring voltage levels, Internet connection levels, etc. (block 860). In response to detecting that the problem is resolved, UE 110 may automatically reconfigure itself back to the reduced capability mode (block 870). In this example, the customer associated with UE 110 may pay some additional fee for the time in which UE 110 provided the customer with Internet access. In some instances, the additional fee may be automatically added to the customer's monthly bill associated with services provided via UE 110.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, implementations have been described above with respect to switching a mode of operation based on various triggers or combinations of triggers, such as triggers associated with offers from a service provider, user initiated triggers, context related triggers, etc. In another scenario, UE 110 may be experiencing difficulty receiving and/or transmitting communications in a lower capability mode. In this situation, UE 110 may automatically be reconfigured to a higher capability mode based on the detected difficulties.

In addition, various implementations described above have been described with respect to a device configured to operate in multiple modes and receiving software updates with respect to operating in different modes or receiving signals instructing the UE to operate in different modes. In some implementations, different hardware elements, such as different chipsets, may be used in the different operating modes and the trigger or signal to reconfigure the UE may result in utilizing a different chipset within the UE to perform various processing.

Further, implementations have been described above with respect to providing a financial incentive, such as a pricing adjustment, for a user to operate a UE in a reduced capability mode. In some implementations, the financial incentives may increase based on the severity of a detected problem, such as the severity of network congestion in network 150. For example, if congestion in network 150 is very high, service provider 140 may increase a price reduction offer for service at the reduced capability, to attempt to reduce overall network congestion.

In some implementations, additional fees for operating a device in a higher mode, or reduced fees for operating a device in a lower mode, may be applied to a customer's monthly bill. For example, the customer associated with UE 110 may be automatically billed or automatically receive a credit on his/her bill based on the particular scenario.

In addition, implementations have been described above with respect to charging additional fees or reducing fees based on operation of UE 110 as a higher capability device or a lower capability device. In other implementations, an advertising-based model may be used instead of, or in combination with, a fee-based model. As an example, if UE 110 is a home router associated with providing Internet and/or television services to a customer's home and UE 110 operates as a higher capability device to perform additional tasks, such as home monitoring and/or security services, or provide some type of upgraded service, such as increased upload/download speeds for data traffic, the customer associated with UE 110 may agree to receive additional advertisements via his/her television, cell phone and/or Internet service instead of paying an additional fee for configuring UE 110 to operate in the higher capability mode.

Still further, various implementations have been described above with respect to a device operating in accordance with various LTE UE categories. It should be understood that other implementations include devices capable of operating in multiple different modes and are not limited to devices operating in accordance with LTE UE categories. For example, features described above can be used in any scenario involving devices, such as WiFi devices, wireline devices, etc., that can be configured to operate in multiple modes.

Still further, in some of the scenarios described above, over the air software updates were provided to the UE to reconfigure the UE for a different mode of operation. However, in other instances, the UE may support multiple modes of operation and no software update is required to reconfigure the UE. In these cases, a service provider may merely signal the UE to operate in the particular mode. In still other situations, the UE itself may detect the particular operating conditions or problems and automatically reconfigure itself in the appropriate mode.

Lastly, while series of acts have been described with respect to FIGS. 5 and 8 and series of signal flows have been described with respect to FIGS. 6 and 7, the order of the acts and signal flows may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   configuring a device, capable of operating in accordance with a first capability level, at a second capability level that is less than the first capability level, wherein the first capability level corresponds to a long term evolution (LTE) user equipment (UE) category 4, category 5 or category 6 level, and the second capability level corresponds to an LTE UE category 1 or category 0 level;
   identifying a communication problem at a location associated with the device, wherein the identifying comprises at least one of detecting a problem with a primary mode of communications for a system at the location associated with the device, or detecting a data throughput problem with respect to communications at least one of from the device or to the device;
   receiving, from a service provider associated with the communication problem and in response to the communication problem, an instruction or a software update, the instruction or software update indicating that the device is to be reconfigured to operate in accordance with the first capability level;
   reconfiguring the device to operate in accordance with the first capability level, in response to the received instruction or software update;
   determining that the communication problem has been resolved; and
   configuring the device to operate in accordance with the second capability level, in response to determining that the communication problem has been resolved.

2. The method of claim 1, wherein the reconfiguring comprises:
   automatically reconfiguring the device in response to the received instruction or software update.

3. The method of claim 1, further comprising:
   providing a monetary incentive to a user associated with the device to operate the device at the second capability level.

4. The method of claim 1, wherein the identifying a communication problem comprises:
   detecting the problem with the primary mode of communications for the system at the location associated with the device, the method further comprising:
   configuring the device to operate as the primary mode of communications for the system in response to detecting the problem with the primary mode of communications.

5. The method of claim 1, wherein the identifying a communication problem comprises:
   detecting the data throughput problem with respect to communications at least one of from the device or to the device, the method further comprising:
   automatically reconfiguring the device to operate in accordance with the first capability level in response to detecting the data throughput problem.

6. The method of claim 1, further comprising:
   receiving user input requesting a processing capability upgrade for the device; and
   reconfiguring the device to operate in accordance with the first capability level in response to the user input.

7. The method of claim 1, further comprising:
   identifying a context or environment in which the device is operating, wherein the context or environment corresponds to a situation in which the first capability level is needed; and
   automatically reconfiguring the device to operate in accordance with the first capability level in response to identifying the context or environment.

8. A device, comprising:
   a communication interface configured to transmit and receive communications;
   a memory configured to store setting information associated with operating the device in accordance with a plurality of modes, wherein a first one of the plurality of modes corresponds to operating at a first capability level, and a second one of the plurality of modes corresponds to operating at a second capability level that is lower than the first capability level, wherein the first capability level corresponds to a long term evolution (LTE) user equipment (UE) category 4, category 5 or category 6 level, and the second capability level corresponds to an LTE UE category 1 or category 0 level; and
   processing logic configured to:
      configure the device to operate in the second mode,
      receive, via the communication interface and from a service provider associated with a communication problem at a location associated with the device, a first instruction or signal to operate the device in the first mode,
      reconfigure the device to operate in the first mode, in response to receiving the first instruction or signal,
      receive a second instruction or signal to operate the device in the second mode,
      configure the device to operate in the second mode, in response to receiving the second instruction or signal,
      detect a problem with a primary mode of communications for a system, and
      automatically reconfigure the device to operate in the first mode in response to detecting the problem.

9. The device of claim 8, wherein the processing logic is further configured to:
   identify a second communication problem in which the first capability level is needed, and
   generate a second instruction or signal in response to identifying the second communication problem, the second instruction or signal indicating that the device is to operate in the first mode.

10. The device of claim 8, wherein the processing logic is further configured to:
    provide a monetary incentive to a user associated with the device to operate the device in the second mode.

11. The device of claim 8, wherein the processing logic is further configured to:
    detect a data throughput problem with respect to communications via the communication interface, and
    automatically reconfigure the device to operate in the first mode in response to detecting the data throughput problem.

12. The device of claim 8, wherein the processing logic is further configured to:
    receive user input requesting a processing capability upgrade for the device, and
    reconfigure the device to operate in accordance with the first capability level in response to the user input.

13. The device of claim 8, wherein the processing logic is further configured to:
    identify a first context or environment in which the device is operating, wherein the first context or environment corresponds to a situation in which the first capability level is needed, and automatically reconfigure the device to operate in the first mode in response to identifying the first context or environment.

14. A non-transitory computer-readable medium having stored thereon sequences of instructions which, when executed by at least one processor in a device, cause the at least one processor to:
configure the device, which is capable of operating in accordance with a first capability level, at a second capability level that is less than the first capability level, wherein the first capability level corresponds to a long term evolution (LTE) user equipment (UE) category 4, category 5 or category 6 level, and the second capability level corresponds to an LTE UE category 1 or category 0 level;
identify a communication problem in which the first capability level is needed;
reconfigure the device to operate in accordance with the first capability level, in response to identifying the communication problem;
determine that the communication problem has been resolved;
configure the device to operate in accordance with the second capability level, in response to determining that the communication problem has been resolved;
detect a second problem with communications involving a system; and
configure the device to operate at the first capability level to function as a primary mode of communications for the system in response to detecting the second problem with communications involving the system;
determine that the second problem has been resolved; and
configure the device to operate in accordance with the second capability level, in response to determining that the second problem has been resolved.

15. The non-transitory computer-readable medium of claim 14, further including instructions for causing the at least one processor to:
receive user input requesting a processing capability upgrade for the device; and
reconfigure the device to operate in accordance with the first capability level in response to the user input.

16. The method of claim 1, wherein the receiving an instruction or software update comprises receiving the software update from the service provider.

17. The device of claim 8, wherein the processing logic is further configured to receive a software update to operate in accordance with the first mode.

18. The non-transitory computer-readable medium of claim 14, further including instructions for causing the at least one processor to receive a software update to operate the device in accordance with the first capability level.

* * * * *